May 28, 1940.  G. O. BENSON  2,202,789
FOLDING NET
Filed March 10, 1939   2 Sheets-Sheet 1
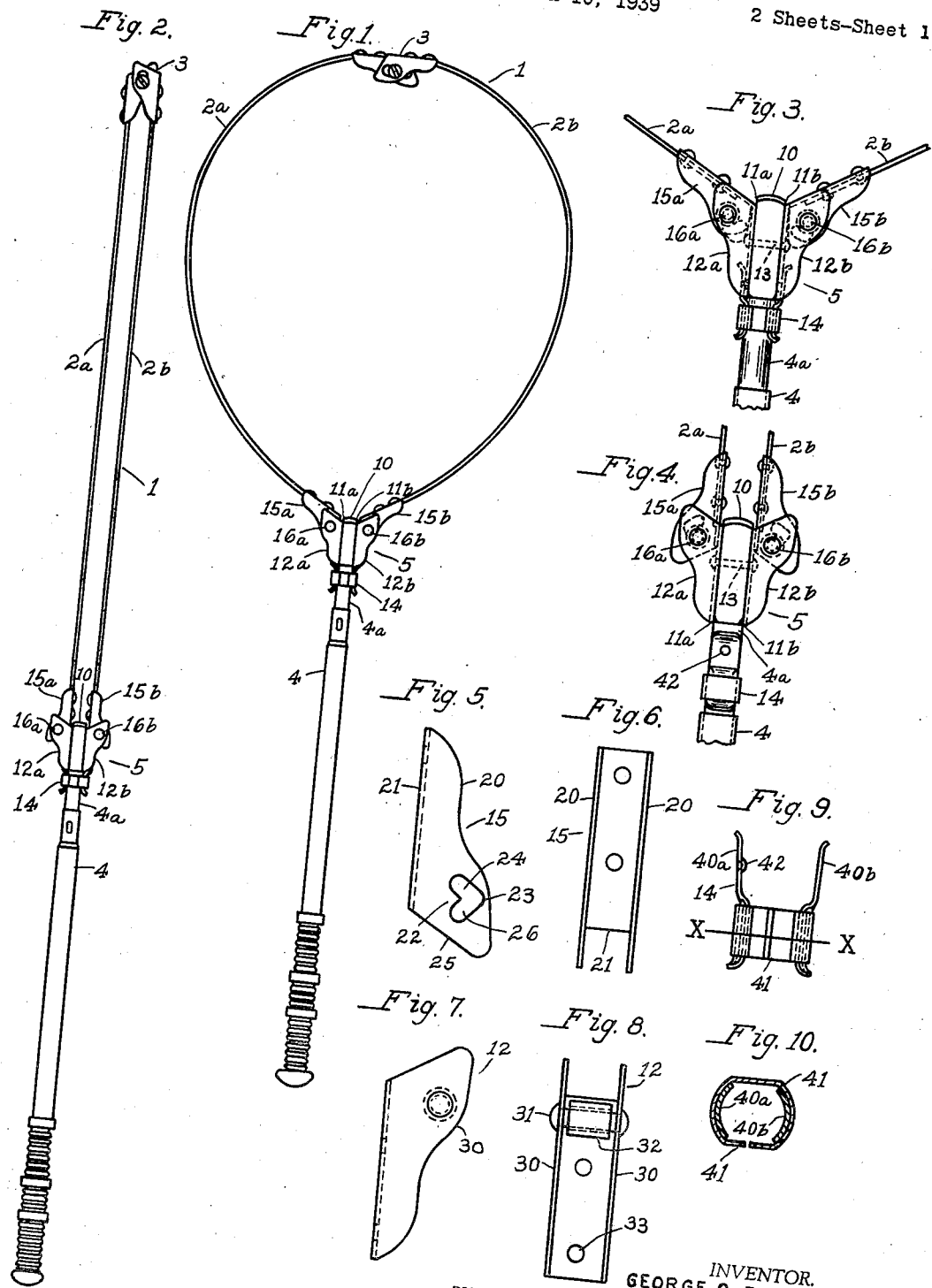
INVENTOR.
GEORGE O. BENSON
BY
Wm. G. Foley
ATTORNEY May 28, 1940.                G. O. BENSON                2,202,789
                              FOLDING NET
                         Filed March 10, 1939            2 Sheets-Sheet 2
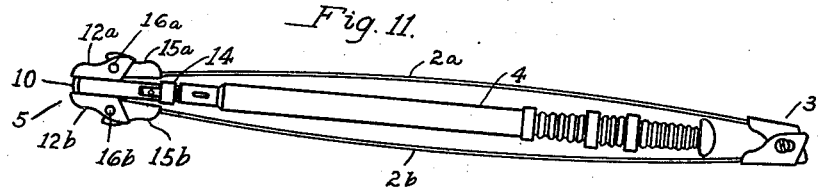
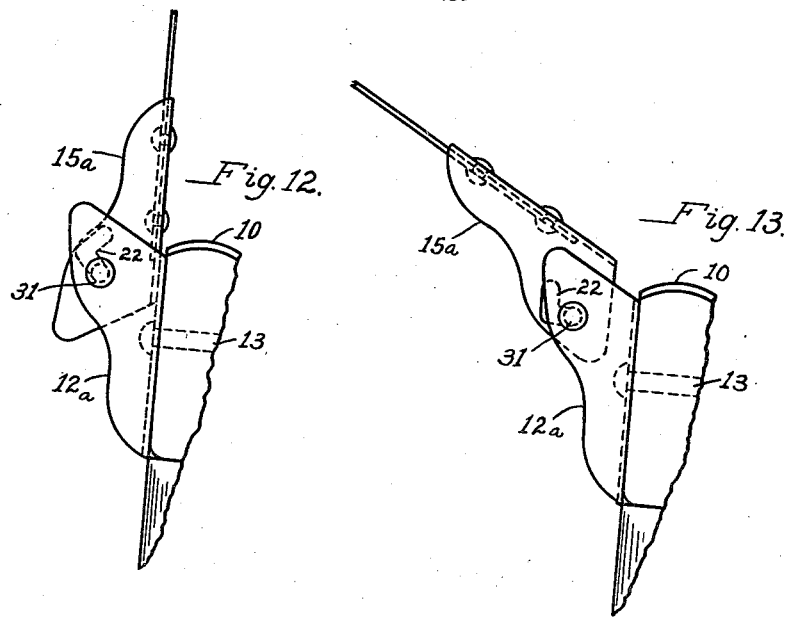
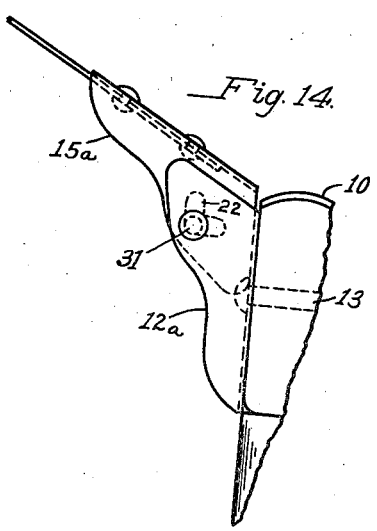
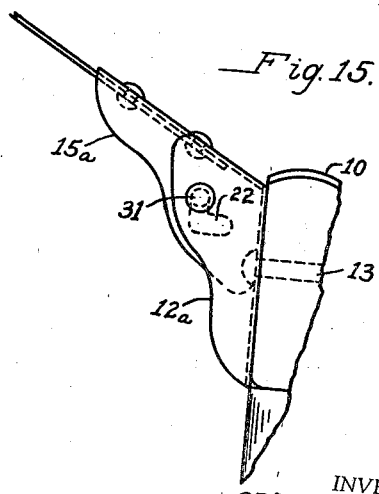
INVENTOR.
GEORGE O. BENSON
BY
ATTORNEY.

Patented May 28, 1940

2,202,789

UNITED STATES PATENT OFFICE 2,202,789

FOLDING NET

George O. Benson, Niagara Falls, N. Y., assignor to Chisholm-Ryder Co., Inc., Niagara Falls, N. Y., a corporation of New York Application March 10, 1939, Serial No. 261,022

6 Claims. (Cl. 43—12)

This invention relates to a folding net and more particularly to a frame and handle for a net of the character used by fishermen for landing fish.

One object of the present invention is to provide a frame and handle construction that is convenient to fold and to unfold. Another object is to provide a hinged joint for the frame and handle that is strong and firm. Other objects will appear from the following disclosure.

The novel features that characterize the present invention are set forth with particularity in the appended claims. The invention, however, will be understood best by reference to the following specification when considered in connection with the accompanying drawings, in which:

Figure 1 is a front view of a handle and frame with the frame in the extended position;

Figure 2 is a front view of a handle and frame with the frame in the collapsed position;

Figure 3 is a front view, enlarged, of the joint between the handle and the frame when the frame is extended as shown in Figure 1;

Figure 4 is a front view, enlarged, of the joint between the handle and the frame when the frame is collapsed as shown in Figure 2;

Figure 5 is a front view of a channel member forming part of the joint between the handle and frame;

Figure 6 is an end view of the channel member of which Figure 5 is a front view;

Figure 7 is a front view of another channel member forming part of the joint between the handle and frame;

Figure 8 is an end view of the channel member of which Figure 7 is a front view;

Figure 9 is a front view of a detent forming part of the joint between the handle and frame;

Figure 10 is a sectional view, taken along the line X—X of Figure 9, of the detent shown in Figure 9.

Figure 11 is a front view of a handle and frame with the frame collapsed and folded over the handle; and Figures 12, 13, 14 and 15 are enlarged front views of a portion of the joint, and each illustrates a step in the procedure of converting the net from the closed to the open condition.

The landing net shown in Figures 1 and 2 comprises a frame 1, for the net, formed of two spring steel members 2a and 2b joined at their upper ends by a hinged joint 3 and joined at their lower ends to a handle 4 by means of a double acting hinged joint 5.

The double acting hinged joint 5 is shown in more detail in Figure 3 and Figure 4, and as there shown comprises a metal terminal portion 10 of the handle 4 having two parallel flat sides 11a and 11b and metal channel members 12a and 12b, respectively, rotatably attached to each of said flat sides by means of a metal pin 13, which passes through the back of each channel member and through the terminal portion 10 of the handle 4. This permits the loop or net frame 1 to be rotated with the pin 13 as a center of rotation when the detent 14, which is slidable and rotatable on the round portion 4a of the handle 4, is moved out of engagement with the channel members 12a and 12b as shown in Figure 3, and into the position shown in Figure 4.

The loop or net frame is joined to the channel members 12a and 12b by means of similarly shaped metal channel members 15a and 15b and pins 16a and 16b; a better understanding of the details of these two types of channel members and the joining pins is to be had by reference to Figures 5, 6, 7 and 8.

In Figures 5 and 6, the channel members 15 to which the two steel net frame members 2a and 2b are attachable are shown in detail, and, as illustrated there, each comprises two parallel side walls 20—20 connected by a web 21. The general shape of the side walls is that of an obtuse scalene triangle, the obtuse angle being approximately 120°. Each side wall has a V-shaped perforation 22 therein, located with its apex 23 pointing away from the web 21. One leg 24 of the perforation is substantially parallel with the shortest edge 25 of the side wall 20, and the center line extended of the other leg 26 of the perforation forms an angle of approximately 50° with the web 21 extended. The over-all width of the channel members 15a and 15b (which are designated by the reference numeral 15 in Figures 5 and 6) to which the net frame members 2a and 2b are attachable is such that they will fit freely, but without undue looseness, between the walls of the other channel members 12a and 12b, which are rotatably fastened to the terminal portion of the handle.

The channel members 12a and 12b that are joined to the terminal portion of the handle are of the same general shape as those described above, and in fact, the blanks for both types of channel members can be made by one cutter and die. In forming the channel members 12a and 12b shown in detail and designated by the reference numeral 12 in Figures 7 and 8, the walls 30—30 are spaced apart just enough to receive the channel members 15a and 15b without undue looseness.

The joining of the two types of channel members, 12 and 15, is accomplished by means of a pin 31 that connects the two side walls of the channel member 12. A spacer sleeve 32 of a length just slightly less than the distance between the side walls of the channel member 15 and which is rotatable on the pin 31 connecting the two side walls of the channel member 12, serves to prevent collapsing of the side walls of the channel member 15 that carries the net frame members, and thus prevents binding of the channel member 15 on the pin 31.

The detent 14 that engages the channel members 12a and 12b that are rotatably attached to the terminal member 10 of the handle 4 is shown in more detail in Figures 9 and 10. It comprises two clips or fingers 40a and 40b and a band 41 encircling them. In order to provide sufficient strength in the band 41 to firmly hold the channel members 12a and 12b and yet have the springiness required for easy operation, the band 41 is interrupted as shown in the drawings. When so made, the band 41 can be of thicker material than if it were continuous, because the break in the band permits the band to expand as the fingers 40a and 40b are pushed into and out of engagement with the channel members 12a and 12b. The clips 40a and 40b need not be attached to the encircling band 41 because the band can be made of such size as to hold the clips against the round portion 4a of the handle 4 in slidable relationship therewith, and when the band is of such size and the clips and band are in position on the handle, the clips and band become detached. In the drawings, the one clip 40a is shown with a lug 42 projecting toward the other clip 40b. This lug serves to engage the hole 33 of either of the channel members 12a and 12b when the detent is in the position shown in Figure 3. The engagement of the lug 42 with the hole 33 in one of the channel members 12a and 12b prevents the detent 14 from inadvertently dropping down and permitting the loop 1 to rotate around the pin 13.

To convert the device from the folded position to the open, the collapsed loop is rotated about the pin 13 and then the detent is given a quarter turn and pushed up until the lug 42 engages the hole 33 in either of the channel members 12a or 12b. The device is then in the condition illustrated by Figure 2 and the hinged joint is as illustrated in Figure 12. Then, with the handle gripped by the right hand close to the double acting hinge member 5, the left hand is caused to grasp the frame member 2a close to the hinge and exert a downward rotative force on the spring member 2a. The application of the downward rotative force causes the channel member 15a to change from the position shown in Figure 12 to that shown in Figure 13. Pressure toward the hinge by the left hand causes the channel member 15a to move toward the terminal portion 10 of the handle 4 by virtue of the engagement of the leg 26 of the V-shaped perforation 22 with the pin 31, and when the apex 23 of the V-shaped perforation reaches the pin 31, as illustrated in Figure 14, a downward pull causes the channel member 15a to move downward by virtue of the leg 24 of the V-shaped perforation until the channel member is in firm engagement against the terminal portion 10 of the handle 4 as illustrated in Figure 15. Then the operation is repeated for the other loop member and finally the hinge 3 at the top of the loop is locked by pulling downwardly on both members until the portions adjacent of the hinge are in substantially a straight line and then pushing the hinge members toward each other. When all of this has been done, the device will have taken the shape illustrated in Figure 1 and is ready for use.

To convert the net from the open position shown in Figure 1 to the closed or folded position shown in Figure 11, the above operations or steps are repeated in the reverse order.

It will be understood that although the invention has been illustrated by the specific embodiments shown in the drawings, the invention is not limited to such specific embodiments. Although the handle is illustrated as having an integral terminal portion to which the hinge members are rotatively attached, the terminal portion can be made detachable from the rest of the handle. If the terminal portion is made detachable, the channel members fastened thereto can be rigidly attached instead of being rotatively attached as hereinabove described. Rotative attachment, however, is necessary for folding the net as illustrated and described herein, and that is possible whether the terminal portion of the handle is detachable or rigidly attached.

Other types of locking hinges can be used for the upper joint of the loop; other forms of detent can be used to lock the double acting hinge joint; and the relationship of the channel members forming the double acting hinge joint at the handle can be reversed by slight modifications of the parts; all without departing from the scope of the invention, which is limited only by the appended claims.

The device of the present invention has many advantages. It has the ruggedness and rigidity necessary for its purpose, yet it is not heavy nor cumbersome; it has no loose parts to become misplaced or lost; it is readily converted from the open to the folded positions and vice versa; and is is not expensive to make.

Having thus described my invention, I claim:

1. A folding net comprising a handle having two parallel sides at one end, a hinge member rotatably attached to each of said parallel sides, a channel member hingedly attached to each of said hinge members, a loop attached at its ends to said channel members, and a detent engageable with the hinge members which are rotatably attached to the handle.

2. A folding net comprising a handle having a terminal portion with two parallel sides, a channel member rotatably attached to each of said parallel sides, a channel member hingedly attached to each of the first mentioned channel members, a loop attached at its ends to the second mentioned channel members, and a detent engageable with the first mentioned channel members to prevent rotation thereof.

3. A folding net comprising a handle having a terminal portion with two parallel sides, a channel member rotatably attached to each of said parallel sides, a channel member having a V-shaped perforation in each side wall thereof hingedly attached to each of the first mentioned channel members by means of a pin which passes through the V-shaped perforations, a detent engageable with the first mentioned channel members to prevent rotation thereof and a flexible, hinged loop attached at its ends to the second mentioned channel members.

4. A folding net comprising a handle having a terminal portion with two parallel sides and a circular section adjoining said terminal portion, a channel member rotatably attached to each of said parallel sides of the terminal portion, a channel member having a V-shaped perforation in each side wall thereof hingedly attached to each of the first mentioned channel members by means of a pin which passes through the V-shaped perforations, a detent slidable and rotatable on the circular section of the handle and engageable with the first mentioned channel members, and a flexible loop attached to its ends to the second mentioned channel members.

5. A net comprising a handle having a terminal portion with two parallel sides, a channel member attached to each of said parallel sides, and a channel member hingedly attached to each of the first mentioned channel members by means of a pin which passes from one wall to the opposite wall of one channel member and also passes through a V-shaped perforation in each of the walls of the other channel member.

6. A folding net comprising a handle having a terminal portion with two parallel sides, a channel member attached to each of said parallel sides, a channel member having a V-shaped perforation in each side wall thereof hingedly attached to each of the first mentioned channel members by means of a pin which passes through the V-shaped perforations.

GEORGE O. BENSON.